United States Patent [19]

Fergason et al.

[11] Patent Number: 4,950,052
[45] Date of Patent: Aug. 21, 1990

[54] ENCAPSULATED LIQUID CRYSTAL APPARATUS WITH A POLYMER ADDITIVE

[75] Inventors: James L. Fergason, San Mateo; Ning S. Fan, Cupertino, both of Calif.

[73] Assignee: Taliq Corporation, Sunnyvale, Calif.

[21] Appl. No.: 237,974

[22] Filed: Aug. 29, 1988

[51] Int. Cl.⁵ .......................... G02F 1/13; B01J 13/00; B32B 5/16; C09K 19/00

[52] U.S. Cl. .................. 350/334; 350/347 V; 252/308; 252/311; 252/312; 252/351; 252/358; 427/213.3; 427/213.34; 427/213.36; 428/1; 428/402.2; 428/402.21

[58] Field of Search .................. 350/334, 347 V, 351; 252/299.01, 308, 309, 312, 351, 358, 311, 299.5, 299.6; 428/1, 402.2, 402.21, 402.22; 427/213.3, 213.31, 213.32, 213.33, 213.34, 213.35, 213.36

[56] References Cited

U.S. PATENT DOCUMENTS

| | | | |
|---|---|---|---|
| 3,852,092 | 12/1974 | Patterson et al. | 350/351 X |
| 4,435,047 | 3/1984 | Fergason | 350/347 VX |
| 4,616,903 | 10/1986 | Fergason | 350/334 |
| 4,669,828 | 6/1987 | Parker | 350/347 VX |
| 4,671,618 | 6/1987 | Wu et al. | 350/347 V |
| 4,673,255 | 6/1987 | West et al. | 350/347 V |
| 4,688,900 | 8/1987 | Doane et al. | 350/347 V |
| 4,707,080 | 11/1987 | Fergason | 350/347 VX |
| 4,767,625 | 8/1988 | Mitsuno et al. | 252/311 X |
| 4,810,063 | 3/1989 | Fergason | 350/347 V |

Primary Examiner—Stanley D. Miller
Assistant Examiner—Anita Pellman Gross
Attorney, Agent, or Firm—Flehr, Hohbach, Test, Albritton & Herbert

[57] ABSTRACT

A liquid crystal apparatus including a latex containment medium, a liquid crystal material dispersed in plural volumes in the medium, and a barrier means forming a wall in plural volumes in said medium so as to preserve the integrity of the volumes of the liquid crystal material.

51 Claims, 1 Drawing Sheet

ENCAPSULATED LIQUID CRYSTAL APPARATUS WITH A POLYMER ADDITIVE

FIELD OF THE INVENTION

The present invention relates generally to liquid crystal, and more particularly to a nematic curvilinear aligned phase (NCAP) liquid crystal film incorporating a polymer additive for forming a protective wall within the containment medium.

BACKGROUND OF THE INVENTION

Liquid crystals are used in a wide variety of devices, including visual display devices. The property of liquid crystals that enable them to be used, for example, in visual displays, is the ability of liquid crystals to transmit light on the one hand and to scatter light and/or absorb it (especially when combined with an appropriate dye) on the other, depending on whether the liquid crystals are in a relatively free, that is de-energized or field-off state, or in a relatively aligned, that is energized or field-on state. An electric field selectively applied across the liquid crystals may be used to switch between the field-off and field-on states.

There are three categories of liquid crystal material, namely cholesteric, nematic and smectic. The present invention relates in the preferred embodiment described hereinafter to the use of liquid crystal material which is operationally nematic. By "operationally nematic" is meant that, in the absence of external fields, structural distortion of the liquid crystal is dominated by the orientation of the liquid crystal at its boundaries rather than by bulk effects, such as very strong twists (as in cholesteric material) or layering (as in smectic material). Thus, for example, a liquid crystal material including chiral ingredients which induce a tendency to twist but which cannot overcome the effects of the boundary alignment of the liquid crystal material would be considered to be operationally nematic.

A more detailed explanation of operationally nematic liquid crystal material is provided in U.S. Pat. No. 4,616,903, issued Oct. 14, 1986, entitled ENCAPSULATED LIQUID CRYSTAL AND METHOD, assigned to Manchester R&D Partnership, the disclosure of which is hereby incorporated by reference. Reference may also be made to U.S. Pat. No. 4,435,047, issued Mar. 6, 1984, entitled ENCAPSULATED LIQUID CRYSTAL AND METHOD, assigned to Manchester R&D Partnership, and which disclosure is also hereby incorporated by reference.

NCAP liquid crystal and devices using NCAP liquid crystal are also described in the above-identified U.S. Pat. No. 4,435,047. A functional NCAP liquid crystal device may consist of NCAP liquid crystal sandwiched between two electrode-coated substrates. The substrates may be polyester (PET) coated with indium tin oxide to form electrodes. The encapsulated NCAP or film may comprise a containment medium containing plural volumes of operationally nematic liquid crystal. The plural volumes may be discrete or interconnected cavities or capsules. The interconnecting channels or passageways may also contain liquid crystal material. This structure is described in more detail in U.S. Pat. No. 4,707,080, issued Nov. 17, 1987, entitled ENCAPSULATED LIQUID CRYSTAL MATERIAL, APPARATUS AND METHOD, assigned to Manchester R&D Partnership, the disclosure of which is hereby incorporated by reference.

A voltage source may be connected between the electrodes to selectively apply an electric field across the liquid crystal material. As is known, the liquid crystal material will scatter and/or absorb light in the field-off state and transmit light in the field-on state. Thus, the liquid crystal material or film will be clear in the field-on state and cloudy or hazy (in the absence of a pleochroic dye) in the field-off state.

The NCAP film may be used in the construction of windows and the like. Such apparatus are described in U.S. Pat. No. 4,749,261, issued June 7, 1988, entitled SHATTER-PROOF LIQUID CRYSTAL PANEL WITH INFRARED FILTERING PROPERTIES, assigned to Taliq Corporation. A window may be fabricated by laminating the electrode-coated substrate that supports the NCAP film to a window surface, for example glass or a sheet plastic, by means of an optically-transparent adhesive or interlayer. One of the more commonly used glass interlayers is polyvinylbutyral (PVB). Others are ethylenevinyl acetate (EVA) and polyurethane.

PVB and EVA are thermoplastic film adhesives as opposed to liquids. As such, they offer convenient handling and processing. These interlayer materials also can provide safety glazing and impact resistance properties. Other advantages include: clearness, low haze, environmental stability, and ultra-violet light absorption.

The lamination of a NCAP film substrate to a glass or plastic surface may, however, adversely effect the electro-optical performance of the film. That is, portions of the film may no longer scatter light as effectively in the field-off state. Thus, those portions would transmit light more specularly and be clearer in the field-off state. This is thought to be caused by mechanical stresses applied to the NCAP film during the lamination process. Such mechanical stresses are believed to cause a change in the shape and/or structure of the cavities, capsules or interconnecting passageways. Additionally, such stresses may cause a flow of liquid crystal, for example to the film's surface, through the passageways or pores in the containment medium. This phenomenon, called "stress clearing", degrades the film's electro-optical performance.

Accordingly, an object of the present invention is to provide an encapsulated liquid crystal material that is more resistant to mechanical stress.

A more specific object of the present invention is to provide a NCAP film incorporating a polymer additive that forms a wall within volumes of the containment medium containing liquid crystal material.

BRIEF SUMMARY OF THE INVENTION

The present invention is directed to a liquid crystal apparatus that includes a containment medium, a liquid crystal material dispersed in plural volumes in the medium, and a barrier means forming a wall in plural volumes in the medium so as to preserve the integrity of the volumes.

The containment medium can be a latex and the barrier means a water soluble polymer. The barrier means and the liquid crystal material have solubility parameters that differ by at least two Hildebrand units. The barrier means may be formed from polyvinylpyrrolidone. This material may be present in an amount between about 0.5% to 30% of the weight of the containment medium. A more specific range is about 1% to 20%, a more preferred range is about 1% to 10%, and the most preferred range is about 1.5% to 5%.

The liquid crystal material can be an operationally nematic liquid crystal having positive dielectric anisotropy. This liquid crystal material is contained in plural volumes in the containment medium.

DESCRIPTION OF THE DRAWINGS

Additional features of the invention will be evident from the following description taken in conjunction with the accompanying drawings wherein.

DESCRIPTION OF THE PREFERRED EMBODIMENTS

Figure 1:
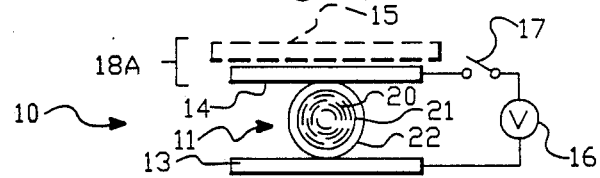
FIG. 1 is a schematic view illustrating a NCAP liquid crystal apparatus.

Referring now to the drawings, attention is first directed to FIG. 1. FIG. 1 shows a NCAP liquid crystal apparatus indicated generally by reference numeral 10 and disclosed in U.S. Pat. No. 4,435,047. The apparatus includes a NCAP liquid crystal supported on a substrate 12 having an electrode 13 located thereon. The apparatus also comprises a second electrode 14 mounted on substrate 15. For the sake of convenience, substrate 12 and electrode 13 may also be referred to as electrode-coated substrate 18, and, similarly, substrate 15 and electrode 14 may be referred to as electrode-coated substrate 18A.

The NCAP liquid crystal 11 includes a liquid crystal material 20 more or less contained within the confines of the interior volume 21 of a capsule 22.

A voltage may be applied to electrode-coated substrates 18 and 18A, and hence across liquid crystal 11 from an AC or DC voltage source 16. Voltage source 16 is connected to electrode-coated substrates 18 and 18A by electrical leads and through selectively closeable switch 17. When switch 17 is closed, a voltage is applied across electrode-coated substrates 18 and 18A causing the liquid crystal molecules to align with the field thereby becoming optically transmissive. When switch 17 is open and no voltage is applied, the liquid crystal scatters and/or absorbs light.

Mounting substrates 12 and 15, and electrodes 13 and 14 can be optically transparent so that the liquid crystal apparatus 10 is capable of controlling the transmission of light therethrough in response to an electric field applied across electrode-coated substrates 18 and 18A. Alternatively, electrode coated substrate 18 may be optically reflective or may have thereon an optically reflective coating so that reflection by such reflective coating of incident light will be a function of whether there is an electric field applied across the liquid crystal 11. Typically, in window constructions, the mounting substrates and electrodes are optically transmissive.

Figure 2:
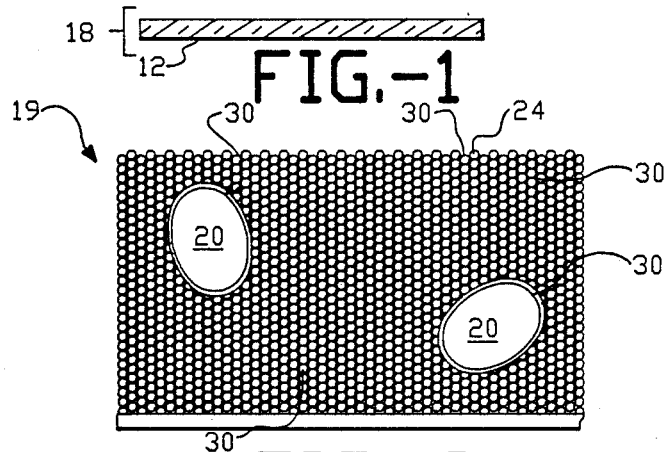
FIG. 2 is a schematic view illustrating a mixture made in accordance with the present invention prior to drying.

FIG. 2 illustrates a layer of an undried mixture 19 obtained when liquid crystal material 20 is combined in an aqueous medium with a suspension of latex particles 24, as disclosed in U.S. Pat. application Ser. No. 171,135, filed Mar. 16, 1988, entitled LATEX ENTRAPPED LIQUID CRYSTAL COMPOSITION, METHOD AND APPARATUS, assigned to Taliq Corporation, which disclosure is hereby incorporated by reference.

FIG. 2 also schematically illustrates a polymer additive 30 added in mixture 19 to coalesce about liquid crystal particles 20 and latex particles 24. Additionally, this protective colloid polymer may be dispersed in the aqueous medium. As will be discussed, the polymer additive serves to maintain the integrity of the liquid crystal volumes as the mixture dries to form the NCAP film. That is, the polymer additive is believed to form a barrier to the flow of liquid crystal material from one capsule to another, from a capsule to the film's surface and/or from a capsule into the film's containment medium.

It is known to those skilled in the art that there is a wide variety of materials from which liquid crystal 20 in mixture 19 may be chosen. This degree of choice also exists within the nematic category of liquid crystal. As a consequence and as discussed heretofore, this invention is not limited to any category of liquid crystal or to any specific material.

It is also known to those skilled in the art of paint formulation that there is a great number of compositions with which latex particles, such as those in mixture 19, may be made. This invention, therefore, is not limited to any particular latex compositions disclosed but rather extends to any latex formulation which may be used to entrap liquid crystal material.

The choice of liquid crystal and latex particles will depend upon a variety of physical properties for each material, for example the solubility of the liquid crystal material in the latex particles. In general, the solubility of the liquid crystal material in the latex particles should be less than about 20% of the initial volume of liquid crystal material. If the liquid crystal is relatively insoluble in the latex, a dispersion of discrete liquid crystal particles in the latex medium may be formed. Such compositions are highly efficient in scattering and/or absorbing light in the field-off state but are optically transmissive in the field-on state.

The solubility parameter ($\delta$) of a material can be calculated from the following equation:

$$\delta = \frac{D \ (\Delta H_v - RT)^{\frac{1}{2}}}{M}$$

where D is density of the material, $\Delta H_v$ is the heat of vaporization, T is the temperature in degrees Kelvin, M is the molecular weight of the compound, and R is the gas constant. The units of $\delta$ are $(cal/cm^3)^{\frac{1}{2}}$ but for convenience are designated as the Hildebrand unit (H). An alternate method of calculating the solubility parameter is based on the use of molar attraction constants (G) measured at an appropriate temperature:

$$\delta = \frac{D\Sigma G}{M}$$

where $\Sigma G$ is the sum of the various G values of the groups comprising a particular molecule.

The solubility parameters of latex polymers range from about 6H to about 16H. The solubility parameter of typical liquid crystal material ranges from about 12H to about 13H although the range may extend from about 10H to about 15H. At temperatures below about 50° Centigrade (C), nonpolar liquids, such as the liquid crystal material used in liquid crystal display devices, are miscible with nonpolar polymers when their solubility parameters differ by about 2H units or less. If the liquid crystal material has a solubility parameter of about 12H, it can be determined that latex particles, with solubility parameters below 10H or greater than 14H should be capable of forming latex entrapped NCAP liquid crystal.

Examples of groups of latex polymers with solubility parameters below 10H include: polyethylenes, polypropylenes, polyurethanes, polyacrylics, and polysiloxanes. An example of a latex polymer with a solubility parameter greater than 14H is polyacrylonitrile, which has a solubility parameter of 15.4H. Groups of latex copolymers with solubility parameters less than about 10H include: methacrylate-acrylonitriles, urethane-acrylics, acrylate-acrylonitriles, styrene-acrylonitriles, and vinylidene chloride-acrylonitriles. These groups of latex polymers and copolymers include the unsubstituted polymer and copolymer as well as the wide variety of polymers and copolymers obtained by substituting various functional groups in the monomers used to make such polymers and copolymers.

As discussed in the above-referenced application Ser. No. 171,135, it also has been observed experimentally that latex NCAP liquid crystal compositions may be made even if the theoretical solubility parameters of the liquid crystal and latex particles are close to each other. Thus, the theoretical solubility parameters of liquid crystal and latex particles may be used to select components for the composition when the solubility parameters differ by more than 2H units. If the difference in solubility parameters is less than 2H units, the choice of liquid crystal and latex particles may be based on an empirical determination that the liquid crystal and latex particles chosen can produce a functional composition.

Also as noted in application Serial No. 171,135, the choice of a surfactant which may be necessary to generate an emulsion of liquid crystal particles in an aqueous phase is an important consideration, since the liquid crystal particle size may be controlled by the amount and chemical characteristics of the surfactant. The particle size, in turn, determines the electro-optical properties of an apparatus.

The amount of surfactant used for emulsifying the liquid crystal material should be the minimal amount needed to stabilized the liquid crystal emulsion and to control the liquid crystal particle size. This is because an excessive amount of surfactant may cause excessive depression of the clearing point temperature of the liquid crystal, rendering a particular composition useless for its intended purpose.

A useful guide in choosing a surfactant relates to the lypophile-hydrophile balance coefficient ("HLB coefficient") of the surfactant. The HLB coefficient reflects the solubility of a substance in oil or water. An HLB coefficient less than about 9 indicates that the surfactant has lypophilic characteristics; i.e., it interacts with the liquid crystal. An HLB coefficient greater than about 12 indicates that the surfactant has hydrophilic characteristics, i.e., it has an affinity for water. Since the emulsification of a liquid crystal material in an aqueous phase is similar to the formation of an oil in water emulsion, surfactants with an HLB coefficient between about 12 and 17 may be required to emulsify a liquid crystal material in an aqueous phase.

For a particular application, the optimal HLB coefficient of the surfactant may be determined experimentally by observing the extent and stability of a liquid crystal emulsion in an aqueous phase as a function of a surfactant's HLB coefficient. The HLB coefficient is, however, only one parameter which may be considered in choosing an appropriate surfactant.

Even though a surfactant may have an HLB coefficient close to the experimentally-determined optimal HLB coefficient, the amount of surfactant needed for emulsification may be related to the chemical characteristics of the surfactant. Since it is desirable to minimize the amount of surfactant, surfactants from different chemical classes with HLB coefficients close to the experimentally-determined optimal HLB coefficient may be selected to determine for each chemical class the minimal amount of surfactant needed to practice the present invention. The preferred surfactant may then be chosen based on these results.

Figure 3:
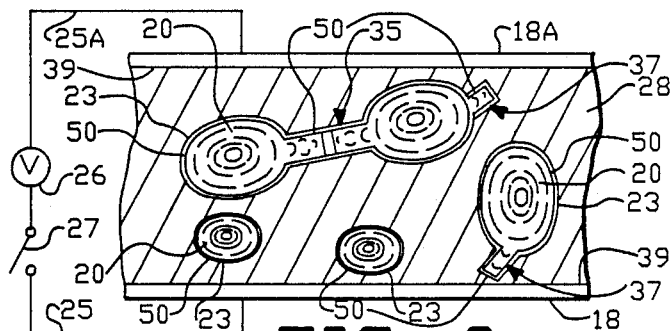
FIG. 3 is a schematic view illustrating a device made in accordance with the present invention in the absence of an electric field.
Figure 4:
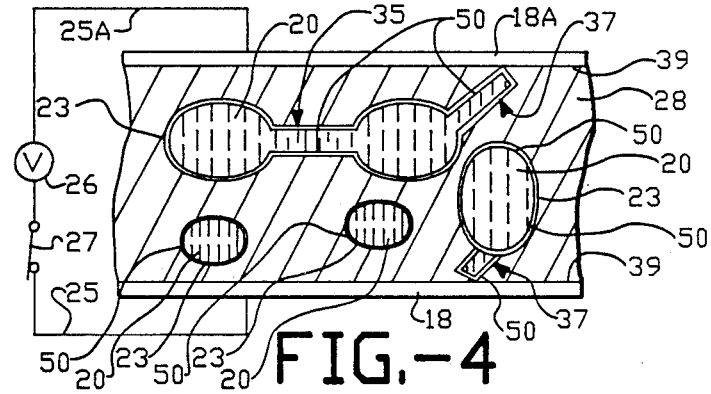
FIG. 4 is a schematic view illustrating a device made in accordance with the present invention in the presence of an electric field.

As mentioned, the mixture of the present invention further includes a protective colloid polymer 30 that is believed to form walls 50 in the dried composition. As shown in FIGS. 3 and 4, volumes of liquid crystal 20 are dispersed throughout containment medium 28. The liquid crystal 20 may be located in capsules 23, and in passageways or channels 35 and 37. The capsules 23 may be interconnected by passageways 35. Such interconnecting passages occur relatively randomly. Some capsules may not be interconnected to others, while some may be interconnected by one or more passages 35 to one or more other capsules. The interconnections can be continuous or substantially continuous, or may be discontinuous. The capsules may also be connected by pores or passageways 37 to the surface 39 of the film.

Protective wall 50 is formed in the volumes of liquid crystal material dispersed throughout containment medium 28. It is thought that wall 50 is formed along the outer boundaries of capsules 23 at the interface with the containment medium, and along passageways 35 and 37. As such, the wall forms a barrier between containment medium 28 and liquid crystal 20. It is also believed that inner wall 50 is formed in passageways 35 to block the flow of liquid crystal 20 from one capsule to another. Similarly, wall 50 may exist across passageway 37 to prevent the flow of liquid crystal 20 to surface 39. In this manner, the integrity of the liquid crystal volumes as they exist in the aqueous medium are preserved in the dried film.

This inner wall or interlayer effectively provides a shell around the liquid crystal material and a barrier to flow, e.g., in the passageways. As a result, the NCAP film has improved resistance to mechanical stresses, which may be imposed thereon, for example, when the film is used in the construction of windows, displays, or other electro-optical devices. Accordingly, the above-discussed "stress clearing" problem is substantially reduced if not, in fact, eliminated.

As noted, wall 50 may seal pores 37 to reduce, if not prevent entirely, the bleeding or flow of liquid crystal to film surface 39, during drying of the mixture prior to lamination to an electrode-coated substrate. In addition to alleviating the "stress clearing" problem, sealing pores 37 permits higher loadings of liquid crystal (the amount of liquid crystal per unit of containment medium material), without bleeding, resulting in a better optical response, i.e. improved contrast between the on and off states. Additionally, optical defects caused by "free" liquid crystal at the film surface may be substantially reduced or eliminated by sealing pores 37. Preventing such bleeding also provides a better surface for adhering the electrode-coated substrate.

Latex is insoluble in water, and the additive that forms inner wall 50 is water soluble. As mentioned, this water-soluble polymer coalesces around the liquid crystal and latex particles during formation of the composition. The additive or wall-forming material 30 should not react with the liquid crystal material; that is, it should not react with known functional groups of the liquid crystal material. Additionally, as in the case of the liquid crystal and latex, the liquid crystal should be relatively insoluble in additive 30.

As discussed, the solubility parameter of a typical liquid crystal material ranges from about 12H to about 13H, and at temperatures below about 50° C., liquid crystal materials are miscible with nonpolar polymers when their solubility parameters differ by about 2H units or less. Thus, using the solubility parameter as a guide, it is believed that additive 30 should have a solubility parameter either below about 10H or above about 15H.

Considering the above characteristics, a water soluble polymer that may be utilized to form wall 50 is polyvinylpyrrolidone (PVP). A solution of PVP is commercially available as PVPK-90 from GAF Chemicals Corp., Wayne, N.J. To minimize impurities, it is preferred that PVPK-90 be further diluted in distilled, deionized (DI) water. Preferably, a 10% solution of PVPK-90 is used. PVP is also commercially available in solid form from GAF Chemicals Corp. as Plasdone K-90.

PVP may be present in an amount between about 0.5% to 30% of the weight of the solid content or medium; i.e., the amount of solid PVP may be about 0.5% to 30% of the amount of solid latex. A more specific range is about 1% to 20%, and a more preferred range is about 1% to 10% of the weight of the containment medium. In a most-preferred apparatus, considering the impedance and humidity factors discussed below, the amount of PVP present should be about 1.5% to 5% of the weight of the containment medium.

The indices of refraction of the liquid crystal and the containment medium material are preferably matched to maximize contrast between the field-on and field-off states. If the index of refraction of the containment medium is not closely matched to the ordinary index of refraction of the liquid crystal material, incident radiation may be refracted in the field-on state resulting in decreased transmission due to scattering and/or absorption. The closeness of the index matching will be dependent on the desired degree of contrast and transparency of the device, but the ordinary index of refraction of the liquid crystal and the index of refraction of the containment medium will preferably differ by no more than 0.07, more preferably 0.01, especially 0.001.

When no field is applied, there may be a difference in indices of refraction at the boundaries of the liquid crystal and the containment medium due to the extraordinary index of refraction of the liquid crystal. This may cause refraction at the interfaces or boundaries and thus enhance scattering and/or absorption. It is thus desirable to choose a liquid crystal material with an ordinary index of refraction matching the index of refraction of the containment medium and an extraordinary index of refraction which differs from the index of refraction of the containment medium and the inner wall.

The index of refraction of the wall material 50 should be approximately the same as the containment medium. Alternatively and preferably, the inner wall may be made relatively thin in comparison to the wavelength of light so that in the field-on state there is no excessive refraction of light at the boundaries of the containment medium, the inner wall and the liquid crystal material. For example, the thickness of inner wall 50 may be less than about 1,000 angstroms. Thus, if inner wall is made thin enough, its index of refraction may not be important in maximizing contrast.

Another consideration in the choice of materials relates to their electrical properties. Ideally, the NCAP film should have a containment medium and an inner wall which each have a dielectric constant that is greater than the dielectric coefficient of the liquid crystal in the absence of an electric field. Preferably, the dielectric constants of the containment medium and the inner wall are about equal. The efficiency of the electro-optical performance is enhanced when the liquid crystal material has a positive dielectric anisotropy, and its ordinary dielectric coefficient is less than the dielectric constants of the containment medium and the inner wall.

Ideally, the extraordinary dielectric coefficient of the liquid crystal should be matched as closely as possible to the dielectric constants of the containment medium and the inner wall. However, it is more important that the extraordinary dielectric coefficient of the liquid crystal match the dielectric constant of the containment medium.

In addition, the containment medium and the inner wall should have a relatively large impedance to ensure that a maximum voltage drop occurs across the liquid crystal, resulting in maximum electro-optical efficiency. In this regard, the composition should have a demonstrated resistance to moisture. That is, the contrast of an apparatus constructed in accordance with the present invention should not degrade when exposed to a high humiditY environment, and there should be very little increase in moisture dependent leakage current. To prevent moisture from being a problem, it is preferred that the amount of PVP not exceed about 5.0% of the weight of the containment medium.

Once the liquid crystal, latex particles and additive 30 are selected, mixture 19 may be made according to the following methods.

The liquid crystal and additive 30 that forms wall 50 may be first emulsified by agitating the liquid crystal in an aqueous solution. Typically, the amount of liquid crystal ranges from about 30% to about 60% of the total emulsion volume. As noted, the wall-forming material 50 may be present in a range from about 1.0% to 20.0% of the total weight of the resulting solid. Surfactants may be employed to generate and maintain the liquid crystal emulsion. Generally, the amount of surfactant may be between about 0.1 wt. % to about 6.0 wt. %, preferably less than 3 wt. % of the total wet emulsion. A surfactant which may be used is IGEPAL CO-610 (available through GAF Corp., New York, N.Y.).

Agitation to form the emulsion may be performed in a colloid mill, a high speed disperser or other devices known to those skilled in the art. The agitation is terminated when the emulsified liquid crystal/protective colloid particles have a diameter from about 1 micron to about 10 microns, and preferably 1-5 microns.

This emulsion and 1-3 volumes of a suspension of latex particles, which range in size from about 0.01 microns to about 2.0 microns and comprising about 20% to about 60% of the suspension volume, may then be slowly combined with constant mixing. A cross-linking agent may be added to further improve the tensile strength and the moisture resistance of the composition. The cross-linking agent utilized is specific to the latex polymer. Cross-linking agents are discussed in detail in the above-identified U.S. application Ser. No. 171,135.

Thereafter, the mixture may be layered onto an electrode-coated substrate 18 (see FIGS. 3 and 4) and dried to generate a solid medium 28 with liquid crystal 20 dispersed therein in volumes and wall 50 formed in such volumes.

An alternate but preferred method is to simply add all of the components together, and emulsify the liquid crystal directly into the aqueous medium. This method has the advantage of ease in processing, but some of the control over particle size may be sacrificed. In this method, the wall-forming material 50, for example PVP, may be added to a mixture comprising the latex particles, the liquid crystal material and the surfactant. This is preferred if the amount of PVP added causes the viscosity of the mixture to be too high. Alternatively, all the components may be added at the same time and then mixed.

Pleochroic dyes such as Oil Blue N, Sudan black, Sudan III and Sudan II (all available through Aldrich Chemical Co., Milwaukee, WI) may also be employed. Generally, such dyes are dissolved in the liquid crystal prior to emulsifying the liquid crystal in an aqueous phase. Such dyes are typically about 0.5 wt. % to about 6 wt. % of the liquid crystal material. Isotropic dyes such as copper phthalocyanine may also be used in quantities ranging from about 0.5 wt. % to 6 wt. % of the liquid crystal material. Inner wall 50 is particularly effective in isolating such dyes from the containment medium so that the dyes do not "bleed" into the containment medium.

EXAMPLE 1

A method for making the apparatus of the present invention may comprise mixing together 2.60 grams of the liquid crystal ZLI-1840 (available through E. Merck Chemicals, Darmstadt, Germany) and 1.30 grams of a 20% aqueous solution of PVPK-90 (available from GAF Chemicals Corp., Wayne, N.J.) with a molecular weight of about 360,000 grams per mole. The solution may be mixed for 30 seconds at 1800 RPM using a Dremel mixer. Thereafter, 0.04 grams of the surfactant IGEPAL CO-610 (available through GAF) can be added to the mixture and blended for 2-3 minutes at 1800 RPM until the entire mixture is emulsified. About 0.02 grams of the surfactant DOW-5098 (available from Dow Chemical, Midland, Michigan) may also be added during the emulsification for defoaming. Thereafter, 41.6 grams of Neorez R-967 (available through Polyvinyl Chemicals, Wilmington, Mass.) containing 40% of latex particles by weight can be added into the emulsified mixture and mixed for one minute at about 1800 RPM until the mixture is homogenous. Then, the mixture may be degassed and 0.12 grams of the cross-linking agent CX-100 (available through Polyvinyl Chemicals) may be added with slow mixing. This material may then be layered with a 0.003" Bird doctor blade or other suitable means onto an appropriate electrode-coated substrate and dried.

The above method may be repeated using in place of the Neorez R-967, UCAR Latex 173 (an acrylic latex available from Union Carbide, Somerset, N.J.). Examples of other liquid crystal materials that may be used in the method include: ZLI-3499, a liquid crystal with a pleochroic dye (available from E. Merck Chemicals), and a smectic liquid crystal mixture S-7 (available from BDH Ltd., Poole, United Kingdom).

EXAMPLE 2

In a preferred method, 6.76 grams of the liquid crystal ZLI-1840 (available from E. Merck Chemicals); 10.24 grams of Neorez R-967 (containing 40% of latex particles by weight); 0.051 grams of the surfactant Dow 5098; and 0.051 grams of a 50-50 blend of the surfactants CO-610 and CO-210 (both available through GAF) may be added into a 30 milliliter plastic beaker. This mixture may then be mixed at 6000 RPM for two minutes, and then at 8500 RPM for another two minutes. Thereafter, 2.60 grams of DI water, 0.307 grams of the cross-linking agent CX-100, and 1.2288 grams of a 10% aqueous solution of Plasdone K-90 may be added to the beaker, and the mixture stirred at 400 RPM for five minutes. The mixture would then be allowed to degas overnight before being coated onto an electrode-coated substrate. In this film, the amount of solid PVP is 3% of the amount of solid latex.

As shown in FIGS. 3 and 4, electrode-coated substrates 18 and 18A may contact the opposite faces of the NCAP film, and be connected by leads 25 and 25A, respectively, to voltage source 26. When switch 27 is open no voltage is applied to the film and the molecules of liquid crystal, depicted as dashed lines, are shown to be distorted by capsules or cavities 23 and passageways 35 and 37 containing the liquid crystal. An array of such molecules will scatter and/or absorb light from all directions since the liquid crystal material as a whole has a random orientation.

When switch 27 is closed as shown in FIG. 4, the electric field causes the molecules of the liquid crystal to align in relation to the electric field. This ordering allows the film to transmit light. When switch 27 is opened, the liquid crystal returns to the orientation schematically depicted in FIG. 3. Response times for the alignment and relaxation of liquid crystal in an electric field are typically on the order of a few milliseconds. A more detailed explanation of this phenomenon may be found in the above-identified U.S. Pat. Nos. 4,435,047 and 4,707,080.

The NCAP liquid crystal film of the present invention is extremely resistant to mechanical stress and has enhanced properties that prevent "bleeding" of the liquid crystal. As such, its electro-optical performance and durability are enhanced. The longevity of a liquid crystal apparatus is also improved when laminated to a glass or sheet plastic surface or substrate as may occur in the fabrication of a window.

Having described a preferred embodiment of the present invention, it will occur to those ordinarily skilled in the art that various modifications may be made to the disclosed embodiments, and that such modifications are intended to be within the scope of the present invention.

What is claimed is:

1. A liquid crystal apparatus comprising: a containment medium, a liquid crystal material dispersed in plural volumes in said medium wherein passageways extend between said volumes and to a surface of said medium, and a barrier means forming a wall in plural volumes in said medium and in at least some of said passageways to preserve the integrity of said volumes.

2. The apparatus of claim 1 wherein said medium is a latex and said barrier means is a water soluble polymer.

3. The apparatus of claim 2 wherein said barrier means and said liquid crystal materia have solubility parameters that differ by at least two Hildebrand units.

4. The apparatus of claim 2 wherein said barrier means is formed from polyvinylpyrrolidone.

5. The apparatus of claim 2 wherein the amount of said water soluble polymer in said apparatus is about 0.5% to 30% of the weight of said medium.

6. The apparatus of claim 2 wherein the amount of said water soluble polymer in said apparatus is about 1% to 20% of the weight of said medium.

7. The apparatus of claim 2 wherein the amount of said water soluble polymer in said apparatus is about 1% to 10% of the weight of said medium.

8. The apparatus of claim 2 wherein the amount of said water soluble polymer in said apparatus is bout 1.5% to 5% of the weight of said medium.

9. The apparatus of claim 1 wherein the thickness of said barrier means is less than the wavelength of visible light.

10. An apparatus comprising a latex containment medium, liquid crystal material dispersed in plural volumes in said medium and wall means formed in plural volumes in said medium at least substantially between said liquid crystal material and said medium to impede the flow of said liquid crystal material wherein said wall means is formed from polyvinylpyrrolidone and wherein said medium induces a generally distorted alignment of said liquid crystal material which in response to said alignment at least one of scatters and absorbs light and which in response to a prescribed input reduces the amount of such scattering or absorption.

11. The apparatus of claim 10 wherein said wall means and said liquid crystal material have solubility parameters that differ by at least two Hildebrand units.

12. The apparatus of claims 10 or 11 further including a dye dissolved in said liquid crystal material.

13. The apparatus of claim 11 wherein said medium is selected from the group comprising polyethylenes, polypropylenes, polyurethanes, polyacrylics, and polysiloxanes.

14. The apparatus of claim 11 wherein said medium is a copolymer.

15. The apparatus of claim 14 wherein said copolymer is selected from the group comprising methacrylate-acrylonitriles, urethane-acrylics, acrylate-acrylonitriles, styrene-acrylonitriles, and vinylidene chloride-acrylonitriles.

16. The apparatus of claim 11 wherein said medium and said liquid crystal material have solubility parameters which differ by at least two Hildebrand units.

17. The apparatus of claim 11 wherein said medium, said wall means and said liquid crystal material have substantially matched indices of refraction in the presence of said prescribed input.

18. The apparatus of claim 11 wherein the thickness of said wall means is relatively thin compared to the wavelength of visible light incident thereon.

19. The apparatus of claim 11 wherein said liquid crystal material occupies about 20% to 60% of the volume of said apparatus.

20. The apparatus of claim 11 wherein said liquid crystal material is dispersed in said medium as particles having a diameter from about 1 micron to about 10 microns.

21. The apparatus of claim 10 further including electrode means for applying an electric field as the prescribed input, substrate means for supporting said electrode means, and circuit means for energizing said electrode means to apply said electric field.

22. The apparatus of claim 10 wherein the amount of said polyvinylpyrrolidone in said apparatus is about 0.5% to 30% of the weight of said medium.

23. The apparatus of claim 10 wherein the amount of polyvinylpyrrolidone in said apparatus is about 1% to 20% of the weight of said medium.

24. The apparatus of claim 10 wherein the amount of polyvinylpyrrolidone in said apparatus is about 1% to 10% of the weight of said medium.

25. The apparatus of claim 10 wherein the amount of polyvinylpyrrolidone in said apparatus is about 1.5% to 5% of the weight of said medium.

26. The apparatus of claim 10 wherein plural volumes in said medium include capsules containing quantities of said liquid crystal material, and said wall means is formed substantially along the surface of said capsules between said liquid crystal material and said medium.

27. The apparatus of claim 26 wherein passageways extend from said capsules and said wall means is formed in said passageways to impede the flow of said liquid crystal material therethrough.

28. The apparatus of claim 10 wherein said medium has undergone cross-linking.

29. An apparatus comprising a latex containment medium, liquid crystal material contained in plural volumes in said medium wherein passageways extend between at least some of said volumes and from at least some of said volumes to a surface of said medium and wherein said liquid crystal material includes operationally nematic liquid crystal having positive dielectric anisotropy, and a water soluble polymer forming a wall in plural volumes in said medium and along said passageways.

30. The apparatus of claim 29 wherein said water soluble polymer and said liquid crystal material have solubility parameters that differ by at least two Hildebrand units.

31. The apparatus of claim 29 wherein said water soluble polymer is formed from polyvinylpyrrolidone.

32. The apparatus of claim 30 wherein the amount of said water soluble polymer in said apparatus is about 0.5% to 30% of the weight of said medium.

33. The apparatus of claim 29 wherein plural volumes in said medium include capsules containing quantities of said liquid crystal material, and said wall is formed substantially along the surface of said capsules between said liquid crystal material and said medium.

34. The apparatus of claim 33 wherein said passageways extend from said capsules and said wall is formed in said passageways.

35. A method comprising:
mixing a liquid crystal material, polyvinylpyrrolidone and an aqueous phase to form a liquid crystal emulsion wherein said polyvinylpyrrolidone and said liquid crystal coalesce; and
combining said liquid crystal emulsion with a suspension that includes latex particles suspended in an aqueous phase such that said polyvinylpyrrolidone forms a wall substantially between said liquid crystal and said latex particles.

36. A method comprising:

combining a liquid crystal material and latex particles in an aqueous phase; and emulsifying said liquid crystal material and thereafter adding a water soluble polymer to form a composition which when coated and dried has said liquid crystal material dispersed in plural volumes in a latex containment medium and said water soluble polymer forms a wall in said plural volumes in said medium at least between said liquid crystal material and said medium wherein said medium induces a generally distorted alignment of said liquid crystal material which in response to said alignment at least one of scatters and absorbs light and which in response to a prescribed input reduces the amount of such scattering or absorption.

37. The method of claim 36 wherein said liquid crystal material and said water soluble polymer have solubility parameters that differ by at least two Hildebrand units.

38. The method of claim 36 wherein said water soluble polymer is polyvinylpyrrolidone.

39. The apparatus of claim 36 wherein the amount of said water soluble polymer in said apparatus is about 0.5% to 30% of the weight of said medium.

40. The method of claim 36 wherein the amount of said water soluble polymer in said composition is about 1% to 20% of the weight of said medium.

41. The method of claim 36 wherein the amount of said water soluble polymer in said composition is about 1% to 10% of the weight of said medium.

42. The method of claim 36 wherein the amount of said water soluble polymer in said composition is about 1.5% to 5% of the weight of said medium.

43. The method of claim 36 wherein the thickness of said wall is less than the wavelength of visible light.

44. The method of claim 43 wherein said liquid crystal material and said medium have substantially matched indices of refraction in the presence of a prescribed input.

45. The method of claim 36 further comprising applying the composition to a substrate prior to drying the composition.

46. The method of claim 36 further comprising selecting said latex particles and said liquid crystal material wherein the difference between the solubility parameter of said liquid crystal material and the solubility parameter of said latex particles is greater than or equal to two Hildebrand units.

47. The method of claim 46 wherein said latex particles are selected from the group comprising polyethylenes, polypropylenes, polyurethanes, polyacrylics, and polysiloxanes.

48. The method of claim 46 wherein said latex particles are copolymers.

49. The method of claim 48 wherein said copolymers are selected from the group comprising methacrylate-acrylonitriles, urethane-acrylics, acrylate-acrylonitriles, styrene-acrylonitriles, and vinylidene chloride-acrylonitriles.

50. The method of claim 36 wherein the amount of said liquid crystal material is from about 30%. to about 60% of the volume of said liquid crystal emulsion, and the amount of said suspension is about 1 to 3 times the volume of said liquid crystal emulsion, and said suspension contains latex particles about 20% to about 60% of the volume thereof where said latex particles have diameters from about 0.01 microns to about 2.0 microns.

51. The method of claim 36 further comprising adding a dye to said liquid crystal material.

* * * * *